United States Patent [19]

Slegers

[11] Patent Number: 5,006,253
[45] Date of Patent: Apr. 9, 1991

[54] METHOD OF OPERATING MEMBRANE SEPARATION SYSTEMS

[75] Inventor: John Slegers, Breda, Netherlands

[73] Assignee: Rohm and Haas Company, Philadelphia, Pa.

[21] Appl. No.: 331,476

[22] Filed: Mar. 31, 1989

[30] Foreign Application Priority Data

Mar. 31, 1988 [GB] United Kingdom ............... 8807825

[51] Int. Cl.⁵ ............................................. B01D 65/02
[52] U.S. Cl. .............................. 210/636; 210/321.69; 210/500.23
[58] Field of Search ................. 210/636, 321.69, 411, 210/406, 323.2, 653, 639, 500.23, 356

[56] References Cited

U.S. PATENT DOCUMENTS

| | | | |
|---|---|---|---|
| 3,462,362 | 8/1969 | Kollsman | 210/653 X |
| 3,782,556 | 1/1974 | Murkes | 210/433.1 X |
| 4,282,097 | 8/1981 | Kuepper et al. | 210/356 X |
| 4,749,476 | 6/1988 | Storkebaum et al. | 210/406 X |

FOREIGN PATENT DOCUMENTS 2850645  6/1980  Fed. Rep. of Germany .
3411471 10/1985  Fed. Rep. of Germany .
2563443 10/1985  France .

OTHER PUBLICATIONS

Koch Membrane Systems, Inc. *Microfiltration helps brewers boost profits* (Wilmington, Mass.).
"Pervaporation Frees the Spirit", Processing, Feb. 1989 pp. 35 and 36.
Millipore, Inc. (Bedford, Mass.), Product Catalog, pp. 186–193 276–282, 294–297.

*Primary Examiner*—Frank Spear
*Attorney, Agent, or Firm*—Mervin E. Brokke; James G. Vouros; Jordan J. Driks

[57] ABSTRACT

An improved method of operating a membrane separation system is provided, which comprises applying a reduced pressure to one side of the or each membrane to thereby cause fluid to be drawn through the or each membrane from the other side thereof.

As the method does not utilize fluid under pressure, which has typically been required in prior art procedures, the risk of damage to the membranes is eliminated, or at least minimized.

11 Claims, 2 Drawing Sheets

METHOD OF OPERATING MEMBRANE SEPARATION SYSTEMS

The present invention is concerned with a method of operating membrane separation systems.

Membrane separation systems, by which we mean ultrafiltration (e.g. in which the membranes have a pore diameter of up to 0.02 micrometers), microfiltration (e.g. in which the membranes have a pore diameter of at least 0.03 micrometers) and reverse osmosis systems, are well known in industry.

Known membrane separation systems may comprise one or more membrane separation units and, in the case of systems comprising a plurality of membrane separation units, such units may be connected in series and/or parallel configuration.

One configuration in which membrane separation units can be operated is the so-called "cross flow" configuration. To enable operation in this configuration, the separation units have a process fluid inlet (i.e. an inlet for fluid to be treated) and a process fluid outlet (i.e. an outlet for treated fluid which has not passed through the membrane) on one side of the membrane. The process fluid to be treated enters the separation unit via the process fluid inlet, passes across the surface of the membrane on the side on which are located the process fluid inlet and outlet, and a portion of the process fluid will pass through the membrane (i.e. as permeate) with the remainder leaving the separation unit via the process fluid outlet and, optionally, being recycled back to the separation unit for further treatment. This type of separation unit, which for convenience will hereinafter be referred to as a separation unit of the cross flow type, may be used for various purposes such as (a) to produce a fluid having a concentration of one or more components thereof which is greater after treatment than before treatment, in which case the desired product is the fluid leaving the separator through the process fluid outlet, (b) to purify a fluid, in which case the desired product is the permeate or (c) to separate one or more components from the fluid, in which case the desired product may be one or more of the fluid passing through the membrane (i.e. the permeate), the fluid leaving the separator through the process fluid outlet, or the component(s) retained by the membrane.

An alternative to cross flow configuration is the so-called "dead-end" configuration. To operate in this configuration, the separation units have a process fluid inlet on one side of the membrane but either do not have a process fluid outlet on that side or any such outlet is closed. The process fluid to be treated enters the separation unit via the process fluid inlet and all of such processed fluid, which is of a molecular size enabling it to pass through the membrane, will pass therethrough as permeate. This type of separator, which for convenience will hereinafter be referred to as a separator of the dead end type, may be used to separate one or more components from the fluid, such separated component(s) being retained by the membrane. In this case the desired product may be the permeate, the retained component(s), or both.

Currently the process fluid is usually introduced into a membrane separation system under pressure, this pressure being created by means of a pump located upstream of the process fluid inlet to the membrane separation unit(s). The introduction of the process fluid under pressure creates a pressure differential between the two surfaces of the membrane and this provides the driving force for process fluid to pass through the membrane from the process fluid side thereof to the permeate side thereof. If the membrane separation system is a reverse osmosis system, then the pressure of the process fluid will typically be higher than if the membrane separation system is either an ultrafiltration or a microfiltration system.

If damage to the membranes of a membrane separation system is to be avoided, then it is necessary to carefully control the pressure of the process fluid entering the system such that the pressure differential between the opposite surfaces of the membrane (i.e. the transmembrane pressure difference) does not exceed the maximum allowable transmembrane pressure difference for that type of membrane. The maximum transmembrane pressure difference for a particular membrane is the maximum pressure difference, between opposite sides of a membrane, that can be accommodated by the membrane without damage resulting thereto. It would clearly be advantageous if a method of operating a membrane separation system could be developed which eliminates, or at least minimises, the risk of such damage to the membranes of the system.

If a pump is used to create the pressure in the process fluid introduced into the system, damage to the membranes can also occur due to the possibility of hydraulic pressure surges being created by the pump.

During use of a membrane separation system, the side of the membrane contacting the fluid to be treated (i.e. the process fluid) will typically become fouled by material retained by the membrane. In the case of cross flow separators, such fouled membranes may be cleaned and reused, and such cleaning away be effected by one or more of the following procedures:

(i) mechanically removing the foulant material, for example, by use of a brush or rod. This procedure is, however, impractical where the space through which the process fluid flows is very narrow, for example, in hollow fibre membranes.

(ii) pumping a flushing fluid, for example water, at high flow rate across the fouled surface of the membrane to physically dislodge and remove the foulant therefrom. This procedure, which will hereinafter be referred to as "fast flush" is not entirely satisfactory if the foulant material is strongly adhered to the membrane surface or if the membranes are severely fouled. Further, if the fouling of the membranes is so severe that plugs are formed, preventing free flow of process fluid across the membrane surface, then the fast flush technique may not satisfactorily remove such plugs.

(iii) contacting the fouled surface of the membrane with a chemical cleaning fluid which is capable of dissolving or dispersing the foulant material which is then removed from the system. As in the case of the fast flush procedure, this chemical cleaning procedure, which will hereinafter be referred to as "chemical cleaning", may not be entirely satisfactory if the foulant material is strongly adhered to the membrane surface or if the membranes are severely fouled, for example, if plugs are present, preventing the free flow of fluid across the membrane surface.

(iv) pumping fluid, for example permeate or water, under pressure through the membranes from the permeate side to the process fluid side thereof such that the fluid physically dislodges and removes any foulant material from the surface of the membrane. A disadvantage of this procedure, which will hereinafter be referred to as "pressure backwashing", is that the membrane separation system must be capable of pumping liquid, under pressure, in both directions through the membrane.

An additional significant disadvantage of the above-described fast flush, chemical cleaning and pressure backwashing procedures is that in each of these procedures the cleaning fluid is introduced into the system under pressure. Therefore, as when the system is used in its normal process fluid treatment mode, it is necessary to carefully control the pressure of the cleaning fluid introduced into the system such that the pressure differential between opposite surfaces of the membrane(s) does not exceed the maximum allowable transmembrane pressure difference for that membrane and damage to the membranes is thereby avoided. Therefore, as when the membrane separation system is operated in its normal process fluid treatment mode, it would be clearly advantageous if a procedure could be developed for efficiently cleaning fouled membranes, even severely fouled membranes, which would eliminate, or at least minimise, such risk of damage to the membranes by the introduction into the system of fluid under pressure.

Further in the case of dead-end separators, it is not possible to clean fouled membranes by the fast flush technique and it is often only practical to clean such membranes by the pressure backwashing or chemical cleaning procedure.

Applicants have now surprisingly found that a membrane separation system, comprising cross flow and/or dead end separators, can be operated in its normal process fluid treatment mode, and the membrane(s) of such a system can be efficiently cleaned, by a procedure which avoids the need to apply fluid under pressure to the system and thereby avoids, or minimizes, the risk of the membrane(s) being damaged by the creation of a transmembrane pressure difference exceeding the maximum allowable transmembrane pressure difference or by the creation of pressure surges upstream of the membrane(s).

According to the present invention there is provided a method of operating a membrane separation system comprising one or more membranes, which method comprises inducing flow of fluid through the or each membrane by creating a reduced pressure on the downstream side of the or each membrane.

In the method of the present invention the fluid flowing through the or each membrane does not undergo a phase change as it flows therethrough.

In the broadest preferred embodiment of the method of the invention the pressure of the fluid on the upstream side of the or each membrane is atmospheric, or substantially atmospheric, pressure and the reduced pressure on the downstream side of each or each membrane is subatmospheric pressure.

The reduced pressure may, for example, be created by means of a suction pump, an ejector or a barometric leg located downstream of the or each membrane.

The membrane separation system can comprise one, or a plurality of membrane separation units. If the system comprises a plurality of membrane separation units. If the system comprises a plurality of membrane separation units, these units may be connected in series and/or parallel configuration. Each membrane separation unit may comprise at least two membranes.

The membrane separation units, which may be in the form of ultrafiltration, microfiltration or reverse osmosis units, may comprise polymeric or ceramic membranes. Suitable polymeric membranes include polysulfone, polyvinyl chloride and polyvinylidene difluoride membranes. The membrane separation units may each comprise: (a) a plurality of hollow fibre membranes; (b) a plurality of flat sheet membranes; (c) a plurality of tubular membranes; or (d) a spiral wound membrane. Further, the membrane separation units may be of the cross flow type or of the dead end type.

Membrane separation units suitable for use in the membrane separation system include conventional cartridges comprising at least two membranes housed within a solid outer wall having one or more permeate outlets located therein. The solid outer wall is spaced from the membranes to enable permeate to collect therebetween. If such conventional cartridges are of the cross flow type, there will also be a process fluid inlet and a process fluid outlet and, if they are of the dead end type, there will be a process fluid inlet but no process fluid outlet.

The membrane separation system may also be that disclosed in our co-pending U.S. Pat. application No. 331,471, allowed filed on the same date as the present application.

It is, of course, possible to practise the method of the present invention on any membrane separation system provided such system comprises at least one membrane and is such as to enable the reduced pressure to be created on one side of the membrane(s).

The method of the present invention may be applied to the operation of a membrane separation system in its normal fluid treatment mode. For example, the reduced pressure can be applied to the fluid on the permeate side of the membrane(s) such that fluid is drawn through the membrane(s) from the process fluid side thereof. In the case of membrane separation units of the cross flow type, the fluid drawn through the membrane(s), by the application of the reduced pressure on the permeate side thereof, will flow into the unit through the process fluid inlet and/or the process fluid outlet. In the case of membrane separation units of the dead end type, however, the fluid drawn through the membrane(s), by the application of the reduced pressure on the permeate side thereof, will enter the unit through the process fluid inlet, there being no process fluid outlet in such units.

When the method of the present invention is applied to the operation of a membrane separation system in its normal fluid treatment mode, the fluid to be treated may be any fluid normally treated in such a membrane separation system. For example, the fluid may be an aqueous medium, such as water to be purified, a food, electrodeposition paint or a waste stream.

The method of the present invention is also applicable to the cleaning of fouled membranes, even severely fouled membranes such as those in which a plug of foulant material has formed on the process fluid side of the membrane preventing free flow of process fluid across the membrane surface.

When the method of the invention is used to clean fouled membranes, the reduced pressure is applied on the fouled side of the or each membrane and the resultant flow of fluid, for example water or permeate, through the membrane causes the foulant material to be removed from the surface thereof. In the case of membrane separation units of the cross flow type, the reduced pressure may be applied to the process fluid inlet and/or the process fluid outlet. In the case of membrane separation units of the dead end type, the reduced pressure is applied to the process fluid inlet, there being no process fluid outlet in such dead end type units.

As previously mentioned, the method of the present invention may be applied to the membrane separation system of our co-pending application Ser. No. 331,471 filed on the same date as the present application, such membrane separation system comprising a plurality of discrete membrane separation units, each unit:

(a) comprising at least two membranes;
(b) comprising inlet for process fluid and, optionally, outlet for process fluid; and
(c) being located within a container for permeate, said container comprising a permeate outlet, and wherein the container is such as to enable the membrane separation units to be at least partially, for example fully, immersed in permeate.

When a membrane separation system is operated according to the method of the present invention, the method being used to either effect fluid treatment or cleaning of the membranes, the maximum pressure difference between opposite surfaces of the membrane(s) will be atmospheric pressure plus the hydrostatic head of the fluid on the side of the membrane remote from that to which the reduced pressure is applied. The risk of creating a transmembrane pressure difference which exceeds the maximum allowable transmembrane pressure difference, and which would therefore lead to damage of the membrane(s), is thereby avoided or at least minimised. This is in contrast to the operation of a membrane separation system in its fluid treatment mode under conventional operating conditions wherein the process fluid is introduced under pressure into the system and this pressure must be carefully controlled such that the pressure difference between the opposite surface of the membrane(s) does not exceed the maximum allowable transmembrane pressure difference. It is also in contrast to the operation of membrane separation systems in the membrane cleaning mode by the conventional fast flush, chemical cleaning and pressure backwashing techniques as each of these require fluid to be introduced into the system under pressure and, as just described in connection with the operation of a system in the normal process fluid treatment mode, the pressure of such fluid needs to be carefully controlled such that the pressure difference between opposite surfaces of the membrane(s) does not exceed the maximum allowable transmembrane pressure difference for that particular membrane.

A further advantage of the method of the present invention, when applied to the cleaning of membranes is that it is capable of efficiently cleaning even severely fouled membranes such as those in which a plug of foulant material has formed preventing free flow of process fluid across the membrane surface. In contrast, the conventional fast flush, chemical cleaning and pressure backwashing techniques for cleaning fouled membranes may not be entirely satisfactory in cleaning such severely fouled membranes. In particular, the pressure backwashing technique may even result in plugs of foulant material being more firmly positioned in the system rather than aiding in their removal from the system. This advantage of the method of the present invention, and its comparison with conventional cleaning techniques, will be more readily evident from the discussion of the accompanying drawings.

The present invention will now be further described with reference to the accompanying drawings, in which.

Figure 1:
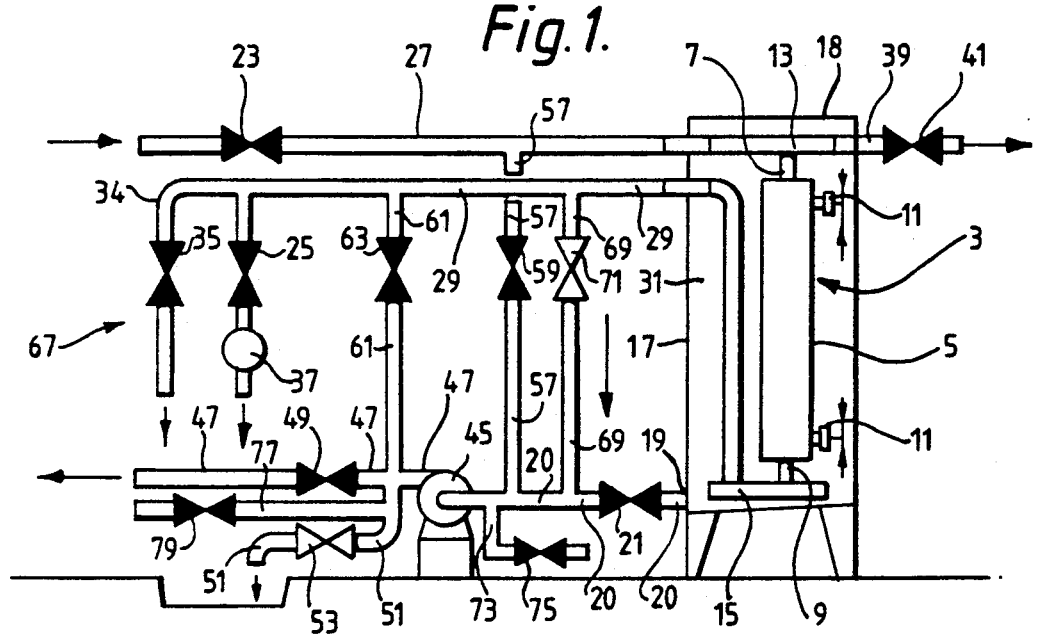
FIG. 1 is a schematic representation of one embodiment of the multiple membrane separation system disclosed in our co-pending application Ser. No. 331,471 filed on the same date as the present application, this system being shown in a cleaning mode utilising the method of the present invention.

Referring to FIG. 1 there is shown a multiple membrane separation system 67 comprising a plurality of ultrafiltration units 3 (only one shown) in the form of conventional ultrafiltration cartridges, each ultrafiltration unit 3 comprising a plurality of hollow fibre ultrafiltration membranes (not shown) enclosed within an outer casing 5. Outer casing 5 is provided with a process fluid inlet 7 for introducing process fluid into the lumen of the hollow fibre membranes, a process fluid outlet 9 for removing treated process fluid from the hollow fibre membranes, and two permeate fluid outlets 11 allowing permeate fluid to exit from the units 3. The process fluid inlets 7 of each unit 3 are connected to a common process fluid inlet 13, and the process fluid outlets 9 of each unit 3 are connected to a common process fluid outlet 15. The permeate outlet(s) 11 of each unit 3 open into the space formed between the units 3 and a container 17 in which the units 3 are housed. Container 17 has a lid 18 and an outlet 19, the outlet 19 enabling permeate fluid to be removed from the container 17 with the flow of permeate fluid through outlet 19 being controlled by valve 21. The pressure within the space 31 formed by container 17, the units 3 and lid 18 is maintained at, or substantially at, atmospheric pressure, for example by having the lid 18 in non-sealing engagement with container 17 or by providing a vent in container 17 or lid 18, this vent connecting space 31 to the atmosphere. Common process fluid inlet 13 has piping 27 connected thereto with a valve 23 being located in piping 27. Common process fluid outlet 15 has piping 29 connected thereto with a valve 25 and flowmeter 37 located therein. Connected to piping 29, intermediate valve 25 and common process fluid outlet 15, is piping 34 having a valve 35 located therein.

Permeate outlet 19 is connected to one end of piping 20 having a valve 21 located therein. The other end of piping 20 is connected to the inlet of a pump 45. The outlet of pump 45 is connected to piping 47 having a valve 49 located therein. Connected to piping 47, intermediate valve 49 and the outlet from pump 45, is piping 51 having a valve 53 located therein. Connected to piping 51, intermediate valve 53 and the junction of piping 51 and piping 47, is piping 77 having a valve 79 located therein.

Interconnecting piping 27 and piping 20 is piping 57 having a valve 59 located therein, one end of piping 57 being connected to piping 27 intermediate valve 23 and common process fluid inlet 13, and the other end of piping 57 being connected to piping 20 intermediate pump 45 and valve 21.

Interconnecting piping 29 and piping 20 is piping 69 having a valve 71 located therein, one end of piping 69 being connected to piping 29 intermediate common process fluid outlet 15 and the junction between piping 29 and piping 34, and the other end of piping 69 being connected to piping 20 intermediate valve 21 and the junction between piping 20 and piping 57.

Interconnecting piping 29 and piping 47 is piping 61 having a valve 63 located therein, one end of piping 61 being connected to piping 29 intermediate the junction between piping 29 and piping 34 and the junction between piping 29 and piping 69, and the other end of piping 61 being connected to piping 47 intermediate pump 45 and valve 49.

The operation of this multiple membrane separation system in the normal process fluid treatment mode is described in our co-pending application Ser. No. 331,471 filed on the same date as the present application.

During use of the system in its normal process fluid treatment mode, foulant material may collect on the process fluid side of the membranes. Periodic cleaning of the membranes will, therefore, be necessary if the membranes are to be reused. This periodic cleaning may be effected by one or both of the fast flush and chemical cleaning techniques. However, as discussed above, these techniques involve the use of fluid under pressure, which pressure must be carefully controlled in order to avoid damage to the membranes. Further, if the membranes have become severely fouled, these techniques, as also discussed above, may not be entirely satisfactory for cleaning the membranes. Applicants have now found that, if the method of the present invention is applied to the cleaning of the membranes, even severely fouled membranes may be satisfactorily cleaned and the risk of damage to the membranes can be avoided, or at least minimised. Even if the hollow fibres of the membrane separation units 3 have become so severely fouled that plugs have formed in the lumen of the hollow fibres, it has been found that the method of the present invention can remove such plugs.

To effect cleaning of the membranes of system 67 by the method of the present invention, valves 71 and 53 are open but all of the remaining valves are closed. Pump 45 is started up and this creates a reduced pressure in piping 20, piping 69, piping 29 and common process fluid inlet 15 and this, in turn, creates a reduced pressure in the lumen of the hollow fibres. Fluid is, therefore, drawn through the hollow fibre membranes from the permeate side into the lumen thereof, thereby dislodging any foulant material from the internal surface of the hollow fibres This foulant material, together with any plugs of foulant material, is then removed, by the reduced pressure, from the membrane units 3 via process process fluid outlet 9. The fluid, containing the foulant material, is then drawn through common process fluid outlet 15, piping 29, piping 69, piping 20 and into pump 45. Pump 45 then pumps the fluid/foulant material through piping 47, piping 51, valve 53 and hence out of the system.

The cleaning of such a multiple membrane separation system utilizing the method of the present invention can be carried out as an alternative to any of the known conventional methods for cleaning fouled membranes (e.g. fast flush or chemical cleaning) or used in addition to any one or more of such conventional methods of cleaning.

If the multiple membrane separation system of FIG. 1 is cleaned as described above, utilizing the method of the present invention, then it can be seen that pump 45 has a multifunctional character. This pump 45 can not only serve to create the reduced pressure required in order to carry out the method of the present invention, but can also be used, by opening of appropriate valves, to provide the pressure required for chemical cleaning of the membrane separation units 3, to aid in removal of permeate from container 17 and to aid in draining of the system, if desired.

Figure 2:
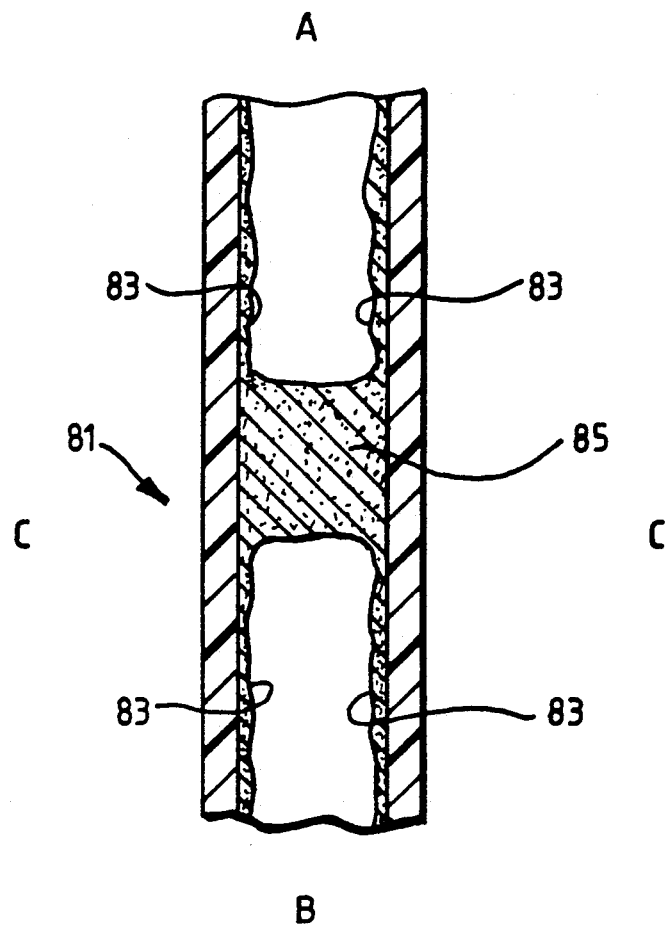
FIG. 2 is a longitudinal sectional view of a single severely fouled hollow fibre membrane.

Referring to FIG. 2 there is shown a longitudinal sectional view of a single hollow fibre membrane 81 in a severely fouled condition. Foulant material 83 is located on the internal surface of the hollow fibre 81 and a plug 85 of foulant material bridges the lumen of hollow fibre 81 preventing free flow of fluid through the lumen.

One possible method for removing a foulant material plug from a membrane separation unit is to physically apply a force to the plug, for example by means of a rod or brush. This method, however, is impractical for membrane separation units in which the passage containing the foulant material plug is very narrow, e.g. as in the present case of hollow fibre membranes.

A further possible method for removing a foulant material plug from a membrane separation unit is to create a pressure difference between opposite sides of the plug, this pressure difference being created by applying fluid under pressure to one side of the plug, e.g. as in the fast flush and chemical cleaning techniques. Thus, if the pressure at end A of the hollow fibre in FIG. 2 is greater than the pressure at end B of the hollow fibre and the cross-sectional area of the plug is $A_p$, a force equal to $(P_1 - P_2) \times A_p$ is applied to the plug and this may be sufficient to dislodge the plug and cause it to move away from the source of pressurised fluid and eventually out of the hollow fibre. Although this procedure may be applied to all types of membranes that are capable of withstanding the application of a pressure on one side of the membrane, it has the significant disadvantage that the pressure applied to the fluid, and hence to the plug of foulant material, must be carefully controlled such that the pressure difference created between the opposite surfaces of the membrane does not exceed the maximum allowable transmembrane pressure difference, otherwise damage to the membrane will result. A further disadvantage is that, over a period of time, and during formation of the foulant material plug, the material of the plug may penetrate into the membrane surface or simply "stick" to the membrane surface. When this occurs, a pressure may be required to remove the plug which will be such as to cause the pressure difference between the opposite surfaces of the membrane to exceed the maximum allowable transmembrane pressure difference and the procedure will, therefore, not be capable of removing the plug without damaging the membrane, for example, damaging the membrane by forming a rip or tear therein.

A still further known method for attempting to remove the foulant material plug 85 is to introduce fluid under pressure into the area C outside the membrane. This will cause the fluid to pass through the membrane into the lumen thereof. However, if the pressure of the fluid within the lumen is the same at both end A and end B thereof, there will be no driving force created by the fluid passing through the membrane which will cause the plug to move to either end thereof. If the plug is, therefore, to be removed by this procedure, the pressure at end A of the lumen of the hollow fibre must be different to that at end B, for example, by allowing fluid to exit the lumen of the membrane through either end A or end B whilst the other end of the lumen is closed.

This procedure of introducing fluid under pressure into area C, however, suffers the disadvantage that the pressure must be carefully controlled in order to ensure that the pressure difference generated between the opposite surfaces of the membrane does not exceed the maximum allowable transmembrane pressure difference, otherwise damage to the membrane will result. An additional disadvantage of this procedure is that the introduction of fluid under pressure into area C can result in compression of the membrane on either side of the plug and this will give rise to a narrowing of the lumen on either side of the plug in the region of this compression and this narrowing will, in turn, make it more difficult to remove the plug from the membrane.

If the plug is not located mid-way between ends A and B of the membrane and fluid under pressure is introduced into area C, then it is possible for a pressure difference to be created across the plug by the simple fluid dynamics within the system but the effect of this pressure difference in enabling the plug to be removed from the membrane is only minimal and may be insufficient to effect efficient removal of the plug.

If the method of the present invention is applied to the fouled membrane illustrated in FIG. 2, then a reduced pressure is applied to the lumen at end A, end B, or both ends A and B of the membrane 81. This reduced pressure results in fluid being drawn through the membrane from area C into the lumen of the membrane and then out of the lumen of the membrane through the end(s) thereof to which the reduced pressure is applied. If the reduced pressure is applied to the lumen at only one of ends A and B of the membrane, then a pressure difference across the plug will be created which will cause the plug to move to that end. Also, the application of the reduced pressure will tend to cause the plug to expand and break up which will further aid in its removal from the membrane. Alternatively, if the reduced pressure is applied to the lumen at both ends A and B of the membrane, then, although there will be no pressure difference across the plug, the reduced pressure will tend to cause the plug to expand and break up and this will enable the plug to be removed from the membrane.

An advantage of utilizing a reduced pressure to remove the plug, and any other foulant material, from the lumen of the hollow fibre membrane 81 is that the maximum pressure difference that can be generated between the opposite surfaces of the membrane is atmospheric pressure plus the hydrostatic head of the fluid in area C, thereby eliminating, or at least minimising, the possibility of exceeding the maximum allowable transmembrane pressure difference for that particular membrane. A further advantage is that the creation of a reduced pressure in the fluid within the lumen of the hollow fibre membrane has a reduced tendency to cause distortion of the membrane, and hence restriction in the cross-sectional diameter of the lumen on either side of the plug, when compared to the known methods of cleaning membranes which utilize the introduction of fluid under pressure into area C.

What is claimed is:

1. A method of cleaning a membrane separation system comprising one or more membranes, which method comprises inducing flow of liquid through the or each membrane by creating a pressure less than atmospheric on the fouled side of the or each membrane while maintaining substantially atmospheric pressure on said fluid on the other side of the or each of said membrane.

2. The method of claim 1 in which the or each membrane separation unit comprises at least two membranes.

3. A method as claimed in claim 2, in which the or each membrane separation unit comprises a plurality of hollow fibre membranes.

4. A method as claimed in claim 3, in which the reduced pressure is applied to the lumen of the hollow fibres.

5. A method as claimed in claim 1, in which the system comprises a plurality of membranes, said plurality of membrane separation units or plurality of membranes being connected in series and/or parallel configuration.

6. The method of claim 1 in which the or each membrane is a polymeric membrane.

7. A method as claimed in claim 1, in which the or each membrane is a ceramic membrane.

8. A method as claimed in claim 1, in which the or each membrane is an ultrafiltration membrane.

9. A method as claimed in claim 1, in which the membrane separation system comprises a plurality of discrete membrane separation units, each such unit:
 (a) comprising at least two membranes;
 (b) comprising inlet for process fluid and, optionally, outlet for process fluid; and
 (c) being located within a container for permeate, said container comprising a permeate outlet, and wherein the container is such as to enable the membrane separation units to be at least partially, for example fully, immersed in permeate.

10. A method as claimed in claim 9, in which a surface of the membrane has foulant material thereon, said surface being that which, when the membrane separation system is in the process fluid separation mode, contacts the process fluid, and said method is operated to remove said foulant material from said surface by creating the reduced pressure on that side of the membranes bearing the fouled surface to thereby draw fluid through the membranes and cause the foulant material to be removed from said surface.

11. A method as claimed in claim 10, in which the membrane separation units are connected in series and/or parallel configuration.

* * * * *